(12) United States Patent
Theriault et al.

(10) Patent No.: US 11,804,139 B2
(45) Date of Patent: Oct. 31, 2023

(54) SYSTEM AND METHOD FOR RECEPTION AND INCONSISTENCY MANAGEMENT OF COORDINATES

(71) Applicant: GE Aviation Systems LLC, Grand Rapids, MI (US)

(72) Inventors: Bryan Adam Theriault, Caledonia, MI (US); Dashiell Matthews Kolbe, Grand Rapids, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 1232 days.

(21) Appl. No.: 16/386,825

(22) Filed: Apr. 17, 2019

(65) Prior Publication Data
US 2019/0244527 A1 Aug. 8, 2019

Related U.S. Application Data

(62) Division of application No. 15/345,898, filed on Nov. 8, 2016, now Pat. No. 10,304,342.

(51) Int. Cl.
*G08G 5/00* (2006.01)
*G01C 21/20* (2006.01)
(Continued)

(52) U.S. Cl.
CPC ............. *G08G 5/003* (2013.01); *G01C 21/20* (2013.01); *G01S 1/0423* (2019.08); *G01S 1/68* (2013.01);
(Continued)

(58) Field of Classification Search
CPC .... G08G 5/003; G08G 5/0013; G08G 5/0021; G08G 5/0039; G08G 5/0082;
(Continued)

(56) References Cited

U.S. PATENT DOCUMENTS 4,359,733 A * 11/1982 O'Neill ................... G01S 13/78
342/36
5,677,841 A * 10/1997 Shiomi ................... G01S 13/74
701/493
(Continued)

FOREIGN PATENT DOCUMENTS

EP 3021306 A1 5/2016
WO WO-2022137656 A1 * 6/2022 ............. G06Q 10/00

OTHER PUBLICATIONS

Partial European Search Report Issued Corresponding to EP Application No. 171998834 dated Mar. 20, 2018.

*Primary Examiner* — Richard A Goldman
(74) *Attorney, Agent, or Firm* — Dority & Manning, P.A.

(57) ABSTRACT

Systems and methods for navigating an aerial vehicle are provided. One example aspect of the present disclosure is directed to a method for navigating an aircraft. The method includes receiving, by one or more processors, one or more first geographic coordinates via an interface configured to receive geographic coordinates from a satellite transmission. The method includes receiving, by the one or more processors, one or more second geographic coordinates via an interface configured to receive geographic coordinates from a ground transmission. The method includes determining, by the one or more processors, that the one or more first geographic coordinates and the one or more second geographic coordinates are inconsistent. The method includes updating, by the one or more processors, a flight plan using the one or more second geographic coordinates when the one or more first geographic coordinates are inconsistent with the one or more second geographic coordinates.

10 Claims, 9 Drawing Sheets

(51) Int. Cl.
  *G01S 1/68* (2006.01)
  *G01S 19/18* (2010.01)
  *G01S 5/00* (2006.01)
  *G01S 1/04* (2006.01)
  *G01S 5/18* (2006.01)
  *G01S 19/42* (2010.01)
  *H04B 7/185* (2006.01)

(52) U.S. Cl.
  CPC ............. *G01S 5/0045* (2013.01); *G01S 5/18* (2013.01); *G01S 19/18* (2013.01); *G01S 19/42* (2013.01); *G08G 5/0013* (2013.01); *G08G 5/0021* (2013.01); *G08G 5/0039* (2013.01); *G08G 5/0082* (2013.01); *H04B 7/18506* (2013.01); *H04B 7/18513* (2013.01); *H04B 7/18517* (2013.01)

(58) Field of Classification Search
  CPC ........ G01S 1/0423; G01S 1/68; G01S 5/0045; G01S 5/18; G01S 19/42; G01C 21/20; H04B 7/18506; H04B 7/18513; H04B 7/18517
  USPC ........................................................ 701/468
  See application file for complete search history.

(56) References Cited

U.S. PATENT DOCUMENTS

| | | | |
|---|---|---|---|
| 5,825,021 A * | 10/1998 | Uemura | G01S 17/04 342/463 |
| 6,480,142 B1 * | 11/2002 | Rubin | G01S 13/951 342/134 |
| 6,531,965 B1 | 3/2003 | Kaiser et al. | |
| 9,100,906 B1 * | 8/2015 | Gauba | H04W 48/20 |
| 9,102,406 B2 * | 8/2015 | Stark | G08G 5/0034 |
| 9,164,178 B2 | 10/2015 | Nichols et al. | |
| 9,816,783 B1 * | 11/2017 | Means | F41J 9/08 |
| 10,222,478 B2 * | 3/2019 | Tangudu | H04B 1/70755 |
| 10,812,992 B1 * | 10/2020 | Tran | H04B 17/12 |
| 2002/0164998 A1 * | 11/2002 | Younis | G01S 19/06 455/456.1 |
| 2003/0146871 A1 * | 8/2003 | Karr | G01S 5/0009 342/465 |
| 2004/0199089 A1 * | 10/2004 | Tasch | A01L 15/00 600/595 |
| 2005/0192741 A1 * | 9/2005 | Nichols | G01C 21/20 701/1 |
| 2005/0233748 A1 * | 10/2005 | Robinson | G01S 5/0289 455/440 |
| 2006/0123050 A1 * | 6/2006 | Carmichael | G06T 7/35 |
| 2007/0046537 A1 * | 3/2007 | Tekawy | H01Q 1/125 342/357.395 |
| 2007/0085738 A1 * | 4/2007 | Whitehead | G01S 19/55 342/357.36 |
| 2008/0078865 A1 | 4/2008 | Burne | |
| 2009/0315704 A1 * | 12/2009 | Rosing | G06Q 10/08 340/539.13 |
| 2010/0004903 A1 * | 1/2010 | Fargas | G06T 17/05 342/357.29 |
| 2010/0017114 A1 * | 1/2010 | Tehan | G01C 21/20 701/423 |
| 2011/0004402 A1 | 1/2011 | Fouet et al. | |
| 2011/0103432 A1 * | 5/2011 | Tangudu | H04B 1/70755 375/150 |
| 2011/0309974 A1 * | 12/2011 | Williamson | G01S 19/41 342/357.24 |
| 2012/0101784 A1 * | 4/2012 | Lindores | A01B 79/005 703/2 |
| 2012/0221244 A1 * | 8/2012 | Georgy | G01S 19/49 701/472 |
| 2013/0029686 A1 * | 1/2013 | Moshfeghi | G01S 5/0236 455/456.1 |
| 2013/0306800 A1 * | 11/2013 | Meissner | G01S 5/0247 244/189 |
| 2013/0335257 A1 * | 12/2013 | Abrahamson | G01S 13/56 342/22 |
| 2013/0335566 A1 * | 12/2013 | Coulter | H04N 7/181 348/144 |
| 2014/0129126 A1 * | 5/2014 | Richardson | G05D 1/00 701/300 |
| 2016/0009402 A1 * | 1/2016 | Hunter | B64D 27/24 244/53 R |
| 2016/0115656 A1 * | 4/2016 | Allega | B05B 12/00 239/69 |
| 2016/0274241 A1 * | 9/2016 | Gentry | G01S 19/03 |
| 2016/0327945 A1 * | 11/2016 | Davidson | B64C 39/024 |
| 2017/0140637 A1 * | 5/2017 | Thurlow | G08B 21/182 |
| 2017/0185849 A1 * | 6/2017 | High | G06V 20/17 |
| 2017/0280108 A1 * | 9/2017 | Matsumoto | H04N 7/183 |
| 2017/0307761 A1 * | 10/2017 | Scot | G01S 19/25 |
| 2018/0130357 A1 * | 5/2018 | Theriault | G01S 1/042 |
| 2018/0189516 A1 * | 7/2018 | Browning | G08G 5/006 |
| 2018/0373268 A1 * | 12/2018 | Antunes Marques Esteves | H04W 4/023 |
| 2019/0035288 A1 * | 1/2019 | Beltman | B64C 39/024 |
| 2019/0129039 A1 * | 5/2019 | Schubert | G01S 17/86 |
| 2019/0202554 A1 * | 7/2019 | Bosworth | B64C 25/32 |
| 2020/0122822 A1 * | 4/2020 | Bosworth | B64U 70/80 |
| 2020/0201350 A1 * | 6/2020 | Newman | E01C 23/16 |
| 2020/0309533 A1 * | 10/2020 | Young | G01C 21/32 |
| 2021/0116580 A1 * | 4/2021 | Utter | G01S 19/37 |
| 2021/0304433 A1 * | 9/2021 | Huang | G01S 19/393 |
| 2021/0385388 A1 * | 12/2021 | Utter | G01S 1/02 |
| 2022/0107184 A1 * | 4/2022 | Omr | G01C 21/1656 |
| 2022/0166495 A1 * | 5/2022 | Liu | H04L 41/16 |
| 2022/0187806 A1 * | 6/2022 | Hammes | G01S 5/0289 |
| 2022/0255223 A1 * | 8/2022 | Tran | H01Q 21/28 |
| 2022/0414362 A1 * | 12/2022 | Lautala | G06T 1/60 |

* cited by examiner

SYSTEM AND METHOD FOR RECEPTION AND INCONSISTENCY MANAGEMENT OF COORDINATES

FIELD OF THE INVENTION

The present subject matter relates generally to ground units for acquiring data.

BACKGROUND OF THE INVENTION

An aerial vehicle can rely on communication systems. The communication systems provide the aerial vehicle with information, such as geographic coordinates, locations of other vehicles, etc. The information provided to the aerial vehicle via the communication systems can be used to navigate the aerial vehicle. The information provided to the aerial vehicle via the communication systems can be predicted to be unreliable when the aerial vehicle is in certain locations. When the information provided to the aerial vehicle via the communication systems is unreliable, the aerial vehicle can be caused to be navigated in undesirable manner.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a method for navigating an aircraft. The method includes receiving, by one or more processors, one or more first geographic coordinates via an interface configured to receive geographic coordinates from a satellite transmission. The method includes receiving, by the one or more processors, one or more second geographic coordinates via an interface configured to receive geographic coordinates from a ground transmission. The method includes determining, by the one or more processors, that the one or more first geographic coordinates and the one or more second geographic coordinates are inconsistent. The method includes updating, by the one or more processors, a flight plan using the one or more second geographic coordinates when the one or more first geographic coordinates are inconsistent with the one or more second geographic coordinates. The method includes creating, by the one or more processors, an alert regarding the inconsistency between the one or more first geographic coordinates and the one or more second geographic coordinates. The one or more second geographic coordinates are received from one or more ground units, the one or more second coordinates being manually entered into the one or more ground units when the one or more ground units are positioned.

Another example aspect of the present disclosure is directed to a system for providing navigation assistance from a ground unit to an aerial vehicle. The system includes a plurality of ground units. Each ground unit includes a memory device. Each ground unit includes one or more sensors. Each ground unit includes one or more processors. The one or more processors are configured to receive environmental data via the one or more sensors. The one or more processors are configured to receive a transmit signal from a first aerial vehicle, wherein the transmit signal is indicative of a communication window. The one or more processors are configured to communicate with at least one of the other of the plurality of ground units in response to the transmit signal in the communication window. The one or more processors are configured to transmit the environmental data to one or more aerial vehicles in response to the received transmit signal in the communication window.

Another example aspect of the present disclosure is directed to a ground unit for providing navigation assistance to an aerial vehicle. The ground unit includes a memory device. The ground unit includes one or more processors. The one or more processors are configured to receive one or more geographic coordinates from a manual input. The one or more processors are configured to receive a transmit signal from a first aerial vehicle, wherein the transmit signal is indicative of a communication window. The one or more processors are configured to transmit the one or more geographic coordinates in response to the received transmit signal to one or more aerial vehicles in the communication window.

Other example aspects of the present disclosure are directed to systems, methods, aircrafts, avionics systems, devices, non-transitory computer-readable media for navigating an aerial vehicle. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
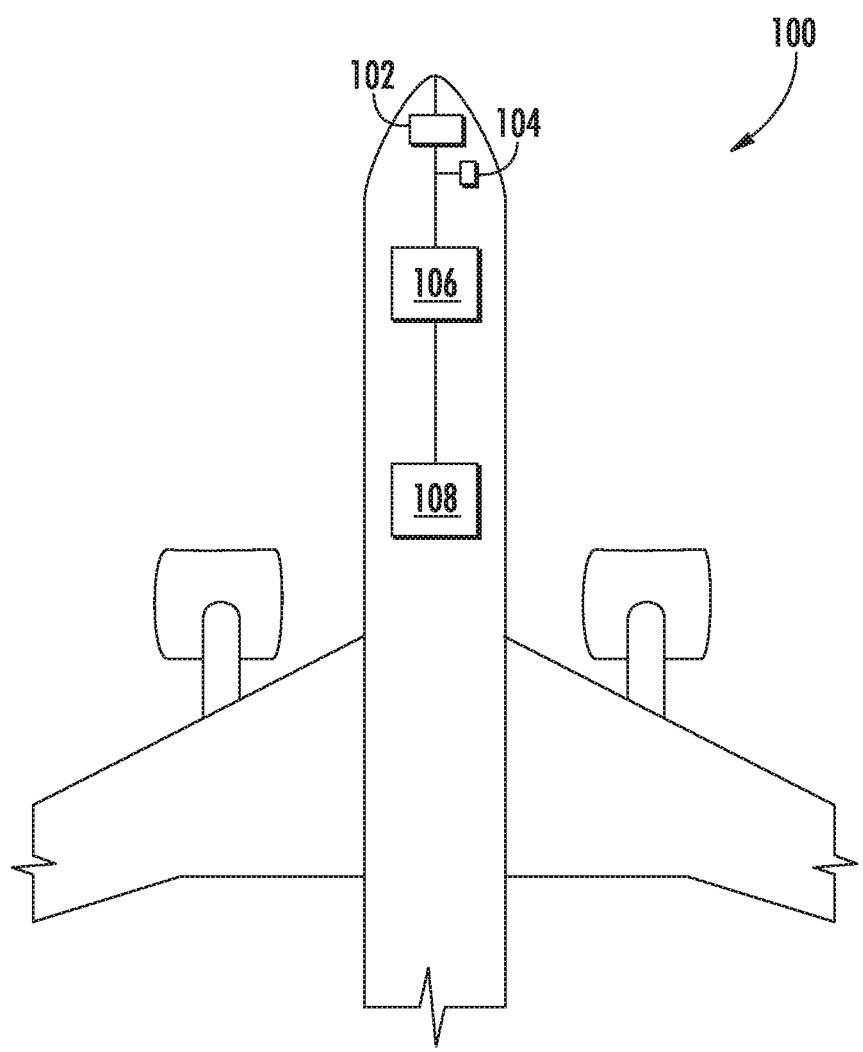
FIG. 1 depicts an aerial vehicle according to example embodiments of the present disclosure.

Reference now will be made in detail to embodiments of the invention, one or more examples of which are illustrated in the drawings. Each example is provided by way of explanation of the invention, not limitation of the invention.

In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to methods and systems that can provide navigation assistance from a ground unit to an aerial vehicle. Geographic coordinates, such as coordinates obtained from a Global Positioning System (GPS) navigation system, can be manually entered (e.g., hardcoded, initiated, etc.) into the ground unit. Once the geographic coordinates are entered, the ground unit can be placed (e.g., dropped, buried, hidden, etc.) in a location associated with the entered geographic coordinates. The ground unit can include one or more sensors. The one or more sensors can sense environmental data, such as acoustic data, video data, image data, chemical data, terrain data, seismic data, magnetic data, temperature data, fire data, smoke data, air data, water data, the like, and/or a combination of the foregoing.

The ground unit can listen for (e.g., receive, accept, wait for, etc.) a transmit signal from an aerial vehicle. The transmit signal can be indicative of a communication window. The transmit signal can indicate that it is safe to transmit information to the aerial vehicle, other aerial vehicles, and/or other ground units during the communication window. The ground unit can be in a dormant (e.g., passive, receiving, listening, waiting, accepting, etc.) mode until the communication window is reached. On receiving the transmit signal and/or once the communication window is reached, the ground unit can transmit the entered geographic coordinates and/or the sensed environmental data to the aerial vehicle, other aerial vehicles, and/or other ground units.

The aerial vehicle can receive the entered geographic coordinates transmitted from the ground unit. The aerial vehicle can receive geographic coordinates via a satellite interface. A comparison can be made between the geographic coordinates received from the ground unit with the geographic coordinates received via the satellite interface. When the geographic coordinates from the ground unit are found to be inconsistent (e.g., incompatible, etc.) with the geographic coordinates received via the satellite interface, the aerial vehicle can use the geographic coordinates received from the ground unit for navigation and/or an alert can be generated (e.g., created, sounded, etc.).

The aerial vehicle can receive the environmental data from a plurality of ground units. The environmental data and/or the geographic coordinates can be used to determine people movement, vehicle movement, chemical weapon deployment, etc. For example, detection of cigarette smoke can indicate a position and/or a movement of one or more people; a detection of exhaust can indicate a position and/or a movement of one or more vehicles; a detection of chemicals can indicate an origin and/or a spread of a chemical event; etc. As another example, the aerial vehicle can receive first geographic coordinates and first sensed acoustic data (such as a Doppler effect sensed by the movement of a second vehicle at a first ground unit) from the first ground unit, second geographic coordinates and second sensed acoustic data (such as a Doppler effect sensed by the movement of the second vehicle at a second ground unit) from the second ground unit, and use the received geographic coordinates and sensed acoustic data to estimate a movement and/or a position of the second vehicle.

The ground unit can receive the environmental data and/or geographic coordinates from one or more other ground units. For example, a first ground unit can receive geographic coordinates and environmental data from a second ground unit. The first ground unit can use the geographic coordinates previously manually entered and the geographic coordinates received from the second ground unit to define a line. The first ground unit can use the environmental data from its sensors and the environmental data received from the second ground unit as evidence that an event occurred (a noise, a chemical, an object, etc.). The first ground unit can receive geographic coordinates and environmental data from a third ground unit. The first ground unit can determine that the third ground unit is on a first side of the defined line based on the geographic coordinates received from the third ground unit. The environmental data received from the third ground unit can indicate that evidence that the event occurred is stronger on the first side of the defined line. The first ground unit can receive geographic coordinates and environmental data from a fourth ground unit. The first ground unit can determine that the fourth ground unit is on a second side of the defined line based on the geographic coordinates received from the fourth ground unit. The environmental data received from the fourth ground unit can indicate that evidence that the event occurred is weaker on the second side of the defined line. An aerial vehicle seeking the event can be instructed to navigate on the first side of the defined line. An aerial vehicle seeking to avoid the event can be instructed to navigate on the second side of the defined line. Further, additional lines can be defined among the various ground units to more granular (e.g., closely, definitively, exactly, etc.) identify the location of the event. In this way, the systems and methods according to example aspects of the present disclosure have a technical effect of assisting an aerial vehicle when traditional communication systems for navigation are inconsistent with the other communication systems for navigation.

FIG. 1 is a vehicle 100 such as an aerial vehicle in accordance with an embodiment of the present disclosure. The vehicle 100 includes a control system 102 for generating a flight path trajectory and flying vehicle 100 along the flight path trajectory, an interface for communicating with ground units of FIG. 2 104, an interface for communicating with satellites 106, a means for placing (e.g., dropping, ejecting, etc.) the ground unit 108, such as a hatch or a door, and a plurality of other systems and subsystems that enable proper operation of vehicle 100. After geographic coordinates are manually entered into a ground unit, the ground unit can be placed into position via the means for placing the ground unit 108. The position in which the ground unit is placed can be or can approximately be associated a position associated with the geographic coordinates entered into the ground unit.

A transmit signal can be send from the vehicle 100 to one or more ground units via the interface for communicating with ground units 104. The transmit signal is indicative of a communication window. The transmit signal can indicate that it is safe for the ground units to transmit information to the aerial vehicle, other aerial vehicles, and/or other ground units during the communication window.

In response to the sent transmit signal, the vehicle 100 can receive information from the one or more grounds unit via the interface for communicating with ground units 104. The information received from the one or more ground units can include geographic coordinates. The geographic coordinates can be geographic coordinates previously manually entered into the ground unit. The manually entered geographic coordinates can correspond to other geographic coordinates, such as Global Positioning System (GPS) coordinates. The information received from the one or more ground units can include environmental data sensed (e.g., accumulated, gathered, etc.) by the one or more ground units. Environmental data can include acoustic data, video data, image data, chemical data, terrain data, seismic data, magnetic data, temperature data, fire data, smoke data, air data, water data, the like, and/or a combination of the foregoing. The information received from the one or more ground units can be used to determine people position and/or movement, vehicle position and/or movement, fire movement (e.g., origin, spread, etc.), chemical movement (e.g., origin, spread, etc.), terrain conditions, the like, and/or a combination of the foregoing. Use of the information received from the one or more ground units will be described in greater detail in reference to FIG. 3.

The vehicle 100 can receive geographic coordinates, such as GPS coordinates, via the interface for communicating with satellites 106. The geographic coordinates received via the interface for communicating with the ground units 104 (first geographic coordinates) can be compared with the geographic coordinates received via the interface for communicating with satellites 106 (second geographic coordinates). If the first geographic coordinates are inconsistent with the second geographic coordinates (that is, if both a position of the vehicle 100 indicated by the first geographic coordinates and a position of the vehicle 100 indicated by the second geographic coordinates are unlikely in light of each other, a speed of the vehicle 100, a time elapsed between receipt of the first geographic coordinates and receipt of the second geographic coordinates), then a flight plan of the vehicle 100 can be updated with the second geographic coordinates. When a determination is made that the first geographic coordinates are inconsistent with the second geographic coordinates, the control system 102 can create an alert to indicate the inconsistency.

The numbers, locations, and/or orientations of the components of example vehicle 100 are for purposes of illustration and discussion and are not intended to be limiting. Those of ordinary skill in the art, using the disclosures provided herein, shall understand that the numbers, locations, and/or orientations of the components of the vehicle 100 can be adjusted without deviating from the scope of the present disclosure.

Figure 2:
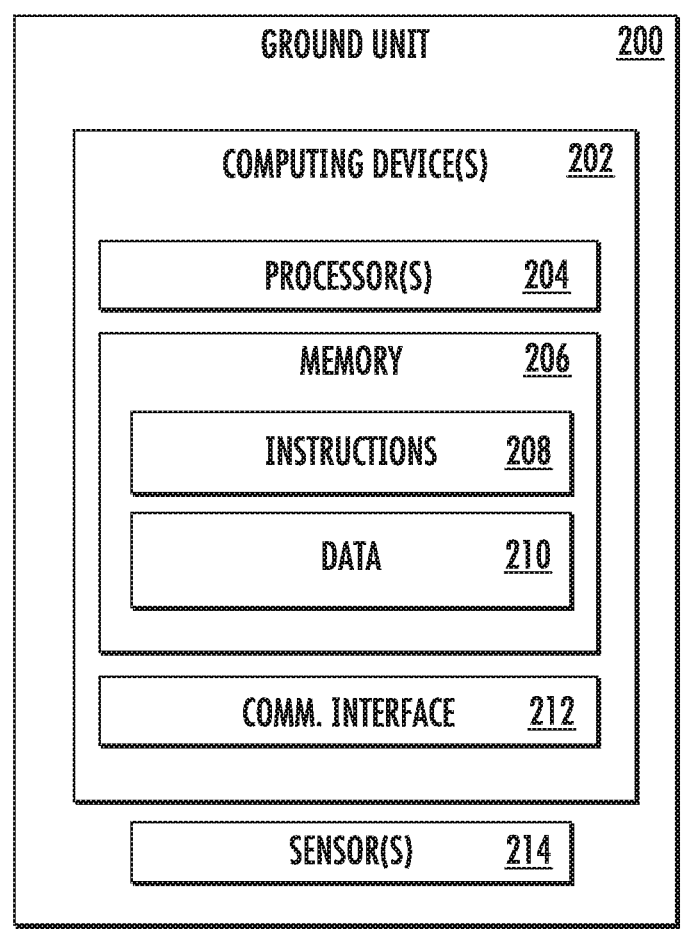
FIG. 2 depicts a ground unit according to example embodiments of the present disclosure.

FIG. 2 depicts a block diagram of an example ground unit 200 or other systems according to example embodiments of the present disclosure. As shown, the ground unit 200 can include one or more computing device(s) 202. The one or more computing device(s) 202 can include one or more processor(s) 204 and one or more memory device(s) 206. The one or more processor(s) 204 can include any suitable processing device, such as a microprocessor, microcontroller, integrated circuit, logic device, or other suitable processing device. The one or more memory device(s) 206 can include one or more computer-readable media, including, but not limited to, non-transitory computer-readable media, RAM, ROM, hard drives, flash drives, or other memory devices.

The one or more memory device(s) 206 can store information accessible by the one or more processor(s) 204, including computer-readable instructions 208 that can be executed by the one or more processor(s) 204. The instructions 208 can be any set of instructions that when executed by the one or more processor(s) 204, cause the one or more processor(s) 204 to perform operations. The instructions 208 can be software written in any suitable programming language or can be implemented in hardware. In some embodiments, the instructions 208 can be executed by the one or more processor(s) 204 to cause the one or more processor(s) 204 to perform operations, such as the operations associated with the ground unit 200, as described with reference to FIG. 4 and/or FIG. 5, and/or any other operations or functions of the one or more computing device(s) 202.

The memory device(s) 206 can further store data 210 that can be accessed by the processors 204. For example, the data 210 can include data associated with geographic coordinates, environmental data, terrain data, and/or any other data associated with ground unit 200, as described herein. In an embodiment, the data 210 includes manually inputted geographical coordinates. The data 210 can include one or more table(s), function(s), algorithm(s), model(s), equation(s), etc. for navigating the vehicle 100 according to example embodiments of the present disclosure. In an embodiment, the data 210 can be compressed prior to storage.

The one or more computing device(s) 202 can also include a communication interface 212 used to communicate, for example, with the other components of system. The communication interface 212 can include any suitable components for interfacing with one or more network(s), including for example, transmitters, receivers, transceivers, ports, controllers, antennas, or other suitable components.

The ground unit 200 can include one or more sensor(s) 214. The one or more sensor(s) 214 can include one or more acoustic sensor(s), one or more optical sensor(s), one or more tactile sensor(s), one or more thermal sensor(s), one or more chemical sensor(s), one or more seismic sensor(s), one or more magnetic sensor(s), the like, and/or a combination of the foregoing. The one or more sensor(s) 214 can detect environmental data. Environmental data can include acoustic data, video data, image data, chemical data, terrain data, seismic data, magnetic data, temperature data, fire data, smoke data, air data, water data, the like, and/or a combination of the foregoing.

Optionally, the ground unit 200 can include an anti-tamper system. The ground unit 200 can include an accelerometer. In an embodiment, in response to the accelerometer detecting that the ground unit 200 is moved, the anti-tamper system can encrypt (e.g., hide, conceal, obfuscate, etc.) data collected, delete (e.g., remove, cancel, zero out, etc.) data collect, self-destruct part or all of the ground unit 200 using, for example, thermite, the like, and/or a combination of the foregoing.

The ground unit 200 can include one or more power source(s). The one or more power source(s) can include one or more thermoelectric generator(s). The one or more power source(s) can include one or more solar panel(s). The one or more power source(s) can include a means of generating power with rain water, such as a microturbine.

Optionally, the ground unit 200 can include devices and/or robotics for locomotion and movement. Movement of the ground unit 200 can be steered by a human. Movement of the ground unit 200 can be automated without assistance from a human. The ground unit 200 can be dropped from the aerial vehicle 100 and move to a suitable position. For example, the ground unit 200 can include robotic spider legs or continuous tracks for moving from a dropped location to a suitable position. As another example, the ground unit 200 can include a drill for burying the ground unit 200 in the ground.

Optionally, the ground unit 200 can include environment-specific camouflage. For example, environmentally appropriate vegetation can be allowed to grow around the ground unit 200 before the ground unit 200 is dropped and/or placed into position.

Figure 3:
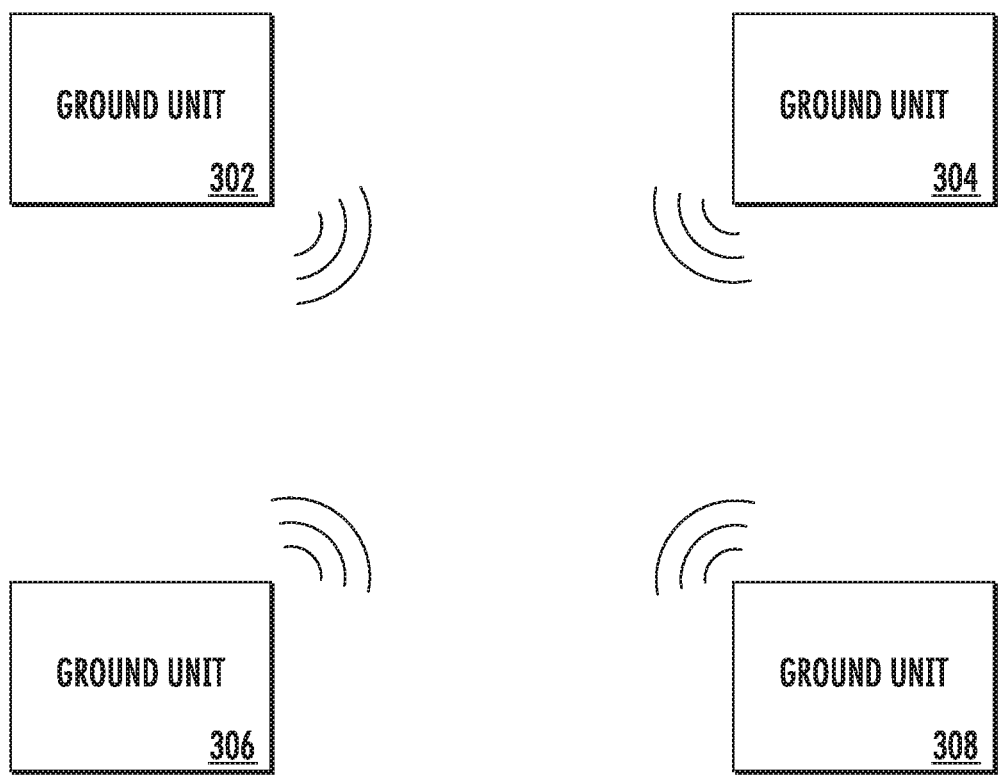
FIG. 3 depicts a plurality of ground units according to example embodiments of the present disclosure.

FIG. 3 depicts a plurality of ground units 302, 304, 306, 308, like the ground unit illustrated in FIG. 2. The plurality of ground units 302, 304, 306, 308 can communicate with one another. In an embodiment, if two ground units cannot communicate directly, then a third ground unit can act as a bridge between the two ground units. In an embodiment, one ground unit can act as a hub and the other ground unit can act as spokes. In such an embodiment, the hub ground unit can perform calculations based on data from itself and data received from the spoke ground units. In another embodiment, processing can be distributed among all of the ground units. For example, if a first ground unit detects an event, then the first ground unit can query (e.g., ping, interrogate, etc.) adjacent ground units about information the adjacent ground units sensed about the event, as well as information received from other ground units about the event that the adjacent ground units have. In another example, if a first ground unit is queried (e.g., pinged, interrogated, etc.) by a second ground unit to the west of the first ground unit about an event and the first ground unit did not detect the event, then the first ground unit can transmit a signal to the second ground unit indicating it has no additional information about the event and determine that it does not need to query a third ground unit to the east of the first ground unit. If a first ground unit is queried by a second ground unit to the west of the first ground unit about an event and the first ground unit did detect the event, then the first ground unit can transmit information about the event to the second ground unit and query a third ground unit to the east of the first ground unit about the event. The first ground unit can return the result of the query of the third ground unit to the second ground unit and so on.

The plurality of ground units 302, 304, 306, 308 can use the techniques described above to determine information about an event. For example, the plurality of ground units 302, 304, 306, 308 can communicate with each other to determine an origin of an event. The event can be one or more of an acoustic event, a chemical event, and a movement of an object. In an embodiment, each of the ground units 302, 304, 306, 308 can transmit information sensed about the event to each other. A ground unit of the plurality of ground units 302, 304, 306, 308 with an earliest time of detection and/or a strongest detection of the event can be determined to be closest to the origin of the event. The origin of the event can be better fine-tuned by determining a second earliest time of detection and/or a second strongest detection of the event, and so on. A spread (e.g., pattern, dissemination, containment, etc.) of the event can be determined by examining the detection time and/or detection strength of all of the plurality of ground units 302, 304, 306, 308.

As another example, the plurality of ground units 302, 304, 306, 308 can communicate with each other to determine a position and/or a movement of one or more targets. A target can be one or more people, animals, vehicles, objects, the like, and/or a combination of the forgoing. In an embodiment, each of the ground units 302, 304, 306, 308 can transmit information sensed about the target to each other. A ground unit of the plurality of ground units 302, 304, 306, 308 with an earliest time of detection can be determined to be closest to a starting position of the one or more targets. The starting position of the one or more targets can be better fine-tuned by determining a second earliest time of detection, and so on. A movement of the one or more targets can be determined by examining the detection time and/or detection strength of all of the plurality of ground units 302, 304, 306, 308. A current position of the one or more targets can be approximated based on a latest time of detection and/or a strongest detection of the one or more targets.

In an embodiment, if two ground units sense an event and/or a target, then the two ground units can define a line. In an embodiment, if two ground units sense an event and/or a target with a same or similar strength, then the two ground units can define a line. For example, a first ground unit 302 and a second ground unit 308 can sense an event and/or a target with a same or similar strength, and a line can be defined between the first ground unit 302 and the second ground unit 308. If a third ground unit 304 senses the event and/or the target with less strength than the first and second ground unit 302, 308, then the event can be determined to be weaker and/or the target can be less likely to be on the side of the line with the third ground unit 304. If a fourth ground unit 306 senses the event and/or the target with more strength than the first and second ground unit 302, 308, then the event can be determined to be stronger and/or the target can be more likely to be on the side of the line with the fourth ground unit 306. If a vehicle desires to avoid the event and/or the target, then the vehicle can stay on the side of the line with the third ground unit 304. If a vehicle desires to engage the event and/or the target, then the vehicle can stay on the side of the line with the fourth ground unit 308. Additional lines can be defined among ground units to determine the location of the event and/or target with more granularity.

In an embodiment, the manually entered geographic coordinates of one or more of the plurality of ground units 302, 304, 306, 308 can be used to determine a location of a vehicle and/or a target. For example, a vehicle can receive the manually entered geographic coordinates from one or more of the plurality of ground units 302, 304, 306, 308 and determine its own location in a manner similar to a Global Positioning System (GPS) system. In another example, one or more of the plurality of ground units 302, 304, 306, 308 can sense the vehicle and/or the target and/or receive a signal from the vehicle and/or the target, indicating that the vehicle and/or the target is within a range of the one or more of the plurality of ground units 302, 304, 306, 308. Time stamps of when the one or more of the plurality of ground units 302, 304, 306, 308 sensed the vehicle and/or target and/or received a signal from the vehicle and/or the target can indicate that each of the one or more of the plurality of ground units 302, 304, 306, 308 received the signal at a same time or at a similar time. The information about the vehicle and/or target can be processed to determine a location and/or a movement of the vehicle and/or the target. The information about the vehicle and/or target can be processed at one or more of the plurality of ground units 302, 304, 306, 308, at the vehicle and/or target, at another vehicle, at a central ground location, the like, and/or a combination of the forgoing.

The location of the vehicle and/or the target can be determined at a time if the vehicle and/or the target is in communication with at least four ground units at the time. The location of the vehicle and/or the target can be determined at a time if the vehicle and/or the target is in communication with at least three ground units at the time and an altitude of the vehicle and/or the target is known at the time. The location of the vehicle and/or the target can be determined at a time if the vehicle and/or the target is in communication with at least two ground units at the time and a Doppler effect of the vehicle and/or the target is sensed at the time. For example, an aerial vehicle can use a time latency between a transmission to the at least two or more ground units, a distance between the at least two ground units, and the Doppler effect of the vehicle and/or the target to determine a location of the vehicle and/or the target.

Figure 4:
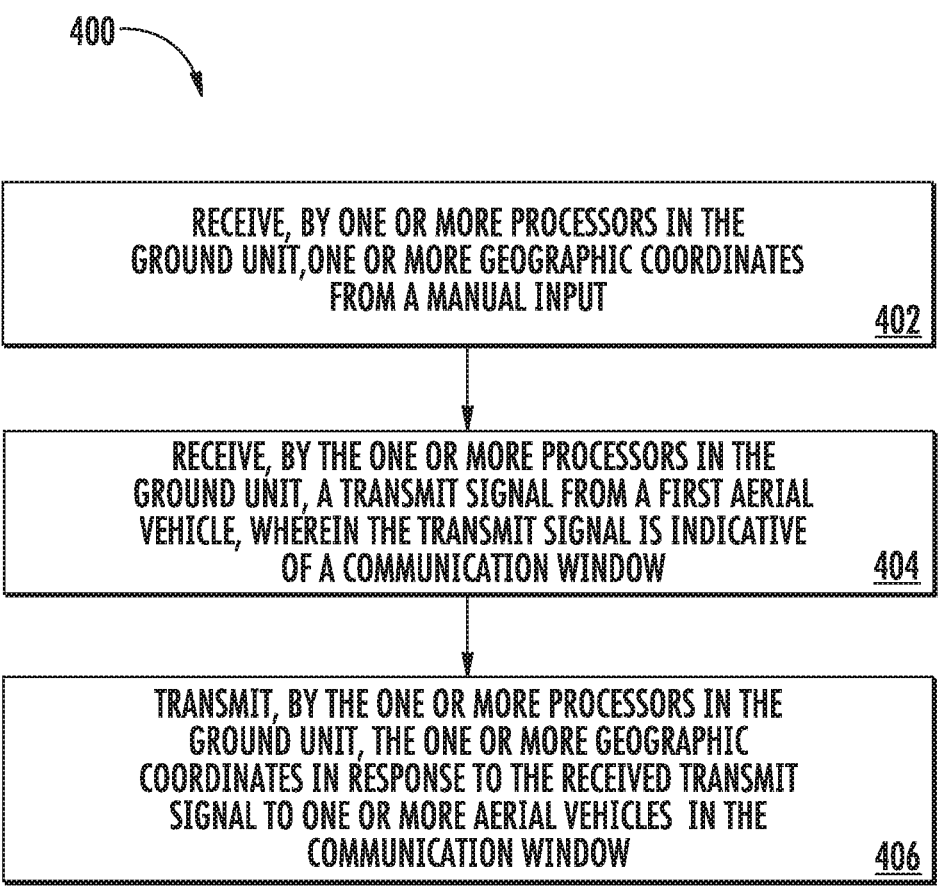
FIG. 4 depicts a flow diagram of an example method according to example embodiments of the present disclosure.

FIG. 4 depicts a flow diagram of an example method (400) for providing navigation assistance from a ground unit to an aerial vehicle. The method of FIG. 4 can be implemented using, for instance, the ground unit 200 of FIG. 2. FIG. 4 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At (402), one or more geographic coordinates can be received from manual input. For instance, the ground unit 200 can receive one or more geographic coordinates from a manual input. The received one or more geographic coordinates can correspond to geographic coordinates associated with a location of the ground unit 200. In an embodiment, once the one or more geographic coordinates are entered into the ground unit 200, the one or more geographic coordinates cannot be changed.

At (404), a transmit signal can be received from a first aerial vehicle. For instance, the ground unit 200 can receive a transmit signal from a first aerial vehicle. The transmit signal can be indicative of a communication window. The communication window can be a time during which the ground unit 200 can transmit information to the first aerial vehicle, other aerial vehicles, and/or other ground units. The ground unit 200 can be in a dormant (e.g., passive, receiving, listening, waiting, accepting, etc.) mode, when not in a communication window indicated by a transmit signal.

At (406), the one or more geographic coordinates can be transmitted in response to the received transmit signal to one or more aerial vehicles in the communication window. For instance, the ground unit 200 can transmit the one or more geographic coordinates in response to the received transmit signal to one or more aerial vehicles in the communication window. In another example, the ground unit 200 can transmit the one or more geographic coordinates in response to the received transmit signal to the first aerial vehicle in the communication window.

Optionally, environmental data can be received from one or more sensors. For instance, the ground unit 200 can receive environmental data from one or more sensors. For example, environmental data can be received from one or more acoustic sensors. In an embodiment, the environmental data can be transmitted in response to the received transmit signal to the one or more aerial vehicles in the communication window. For instance, the ground unit 200 can transmit the environmental data in response to the received transmit signal to the one or more aerial vehicles in the communication window. In another example, the ground unit 200 can transmit the environmental data in response to the received transmit signal to the first aerial vehicle in the communication window. In an embodiment, environmental data can include one or more of acoustic data, video data, image data, chemical data, terrain data, seismic data, magnetic data, temperature data, fire data, smoke data, air data, and/or water data.

Figure 5:
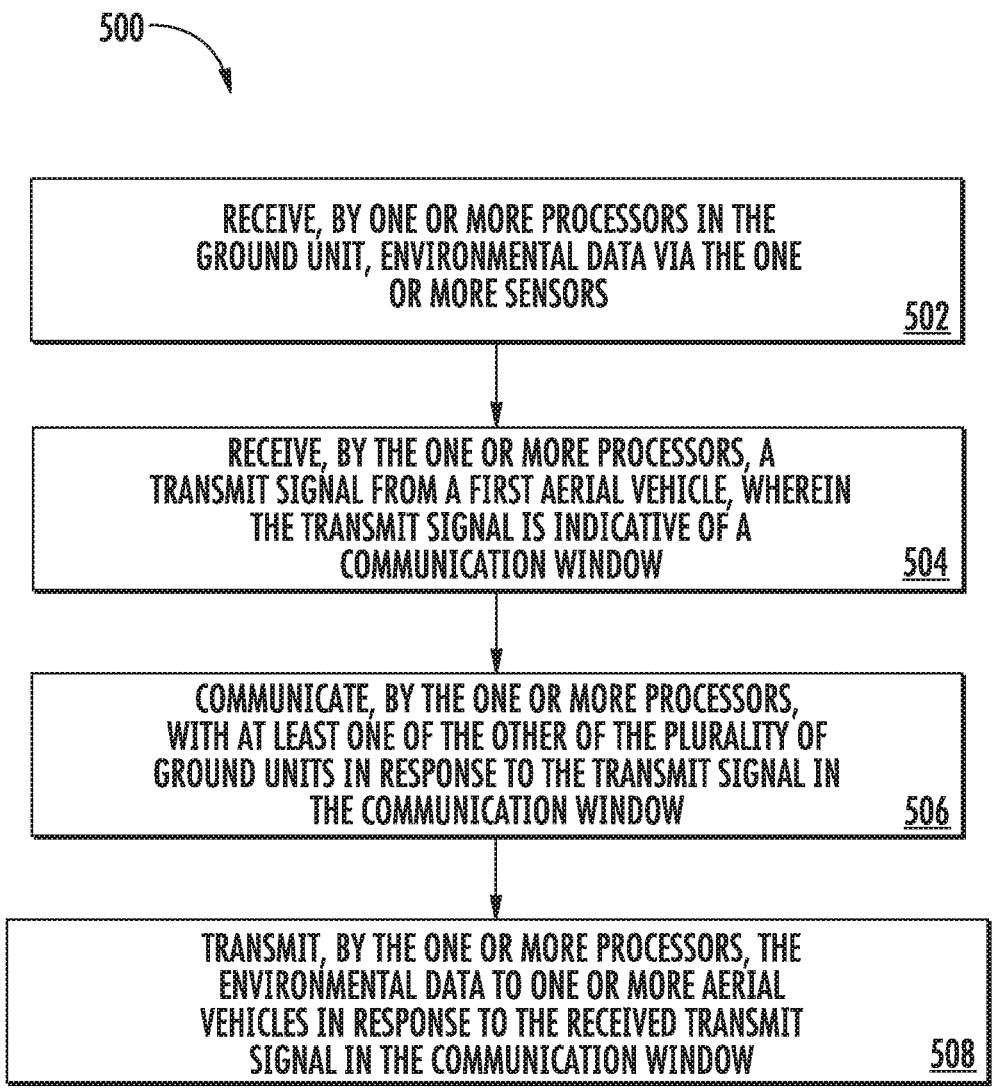
FIG. 5 depicts a flow diagram of an example method according to example embodiments of the present disclosure.

FIG. 5 depicts a flow diagram of an example method (500) for providing navigation assistance from a ground unit to an aerial vehicle. The method of FIG. 5 can be implemented using, for instance, the ground unit 200 of FIG. 2. FIG. 5 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At (502), environmental data can be received via one or more sensors. For instance, the ground unit 200 can receive environmental data via one or more sensors. Environmental data can indicate the occurrence of an event. The event can be one or more of an acoustic event, a chemical event, and a movement of an object. In an embodiment, environmental data can include one or more of acoustic data, video data, image data, chemical data, terrain data, seismic data, magnetic data, temperature data, fire data, smoke data, air data, and/or water data.

At (504), a transmit signal can be received from a first aerial vehicle. For instance, the ground unit 200 can receive a transmit signal from a first aerial vehicle. The transmit signal can be indicative of a communication window. The communication window can be a time during which the ground unit 200 can transmit information to the first aerial vehicle, other aerial vehicles, and/or other ground units. The ground unit 200 can be in a dormant (e.g., passive, receiving, listening, waiting, accepting, etc.) mode, when not in a communication window indicated by a transmit signal.

At (506), at least one of the other of the plurality of ground units can be communicated with in response to the transmit signal in the communication window. For instance, the ground unit 200 can communicate with at least one of the other of the plurality of ground units in response to the transmit signal in the communication window. In an embodiment, one ground unit can act as a hub and receive information, such as the sensed environmental data, from other ground units. For example, a ground unit in communication with the first aerial vehicle can act as the hub. In an embodiment, ground units can transmit information to and receive information from adjacent ground units.

At (508), the environmental data can be transmitted to one or more aerial vehicles in response to the received transmit signal in the communication window. For instance, the ground unit 200 can transmit the environmental data to one or more aerial vehicles in response to the received transmit signal in the communication window. In an embodiment, a hub ground unit, such as a ground unit in communication with the first vehicle, can transmit the environmental data it sensed, as well as the environmental data it received from other ground units to the one or more aerial vehicles.

Optionally, one or more geographic coordinate can be stored in a memory device from a manual input. For instance, the ground unit 200 can store one or more geographic coordinates in a memory device from a manual input. The received one or more geographic coordinates can correspond to geographic coordinates associated with a location of the ground unit 200. In an embodiment, once the one or more geographic coordinates are entered into the ground unit 200, the one or more geographic coordinates cannot be changed. The one or more geographic coordinates can be transmitted to the one or more aerial vehicles in response to the received transmit signal in the communication window. For instance, the ground unit 200 can transmit the one or more geographic coordinates to the one or more aerial vehicles in response to the received transmit signal in the communication window. In an embodiment, an origin of the event can be determined based on the environmental data. In an embodiment, spread of the event can be determined based on the environmental data.

Figure 6:
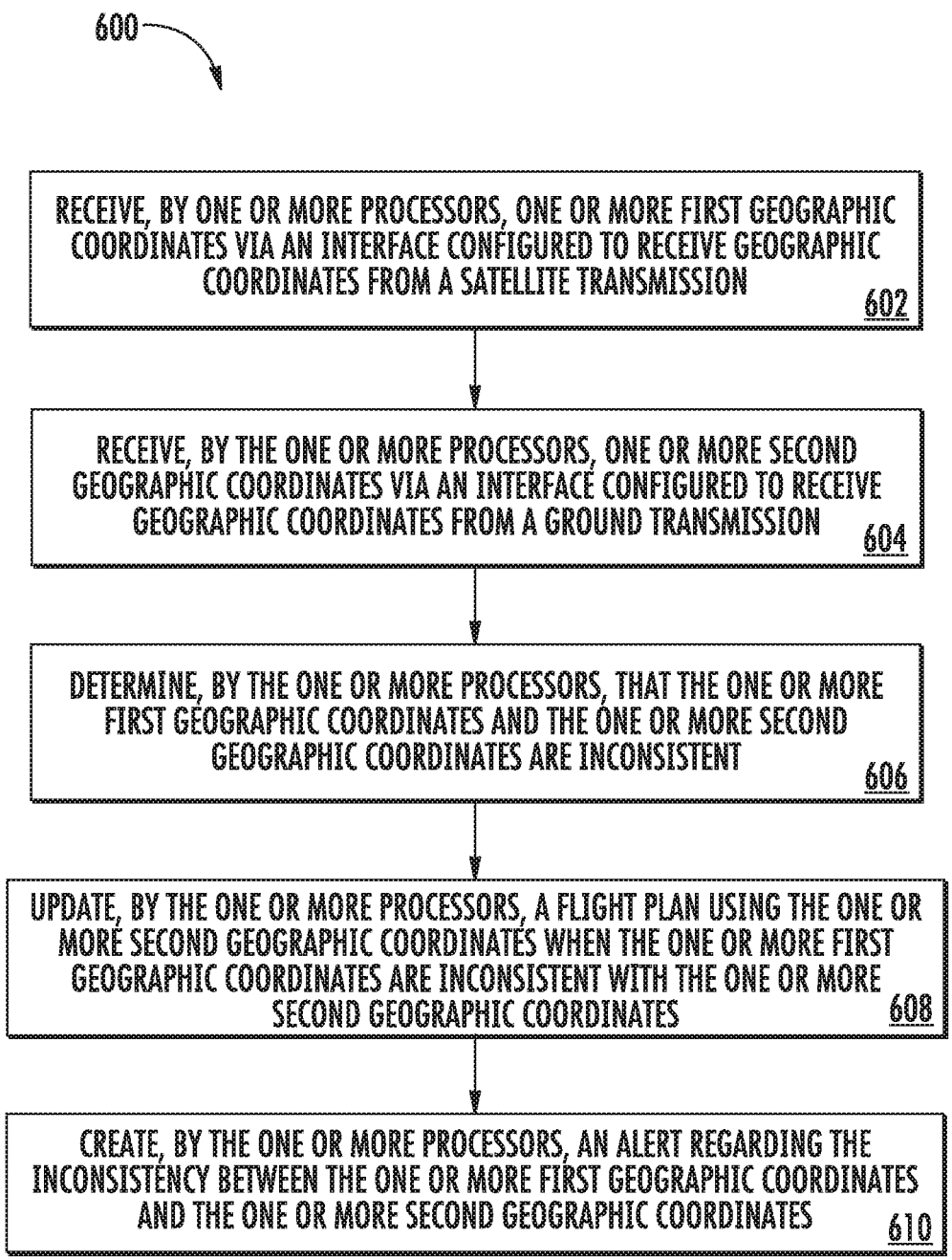
FIG. 6 depicts a flow diagram of an example method according to example embodiments of the present disclosure.

FIG. 6 depicts a flow diagram of an example method (600) for providing navigation assistance from a ground unit to an aerial vehicle. The method of FIG. 6 can be implemented using, for instance, the vehicle 100 of FIG. 1. FIG. 6 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At (602), one or more first geographic coordinates can be received via an interface configured to receive geographic coordinates from a satellite transmission. For instance, the vehicle 100 can receive one or more first geographic coordinates via an interface configured to receive geographic coordinates from a satellite transmission. In an embodiment, the interface configured to receive geographic coordinates from a satellite transmission can be an interface for receiving Global Positioning System (GPS) coordinates.

At (604), one or more second geographic coordinates can be received via an interface configured to receive geographic coordinates from a ground transmission. For instance, the vehicle 100 can receive one or more second geographic coordinates via an interface configured to receive geographic coordinates from a ground transmission. In an embodiment, the vehicle 100 can receive one or more second geographic coordinates via an interface configured to receive geographic coordinates from the ground unit 200. In an embodiment, the vehicle 100 can receive one or more second geographic coordinates via an interface configured to receive geographic coordinates from at least four ground units 200. In an embodiment, the vehicle 100 can receive one or more second geographic coordinates via an interface configured to receive geographic coordinates from at least three ground units 200. In an embodiment, the vehicle 100 can receive one or more second geographic coordinates via an interface configured to receive geographic coordinates from at least two ground units 200.

At (606), a determination can be made that the one or more first geographic coordinates and the one or more second geographic coordinates are inconsistent. For instance, the vehicle 100 can determine that the one or more first geographic coordinates and the one or more second geographic coordinates are inconsistent. The one or more first geographic coordinates and the one or more second geographic coordinates can be inconsistent if both a position of the vehicle 100 indicated by the first geographic coordinates and a position of the vehicle 100 indicated by the second geographic coordinates are unlikely in light of factors, such as each other, a speed of the vehicle 100, a time elapsed between receipt of the first geographic coordinates and receipt of the second geographic coordinates, the like, and/or a combination of the forgoing.

At (608), a flight plan can be updated using the one or more second geographic coordinates when the one or more first geographic coordinates are inconsistent with the one or more second geographic coordinates. For instance, a flight plan of the vehicle 100 can be updated using the one or more second geographic coordinates when the one or more first geographic coordinates are inconsistent with the one or more second geographic coordinates.

At (610), an alert can be created regarding the inconsistency between the one or more first geographic coordinates and the one or more second geographic coordinates. For instance, the vehicle 100 can create an alert regarding the inconsistency between the one or more first geographic coordinates and the one or more second geographic coordinates. In an embodiment, the alert can inform a pilot of the inconsistency between the one or more first geographic coordinates and the one or more second geographic coordinates. In an embodiment, the alert can inform a ground system, such as a ground control or the ground unit 200 of the inconsistency between the one or more first geographic coordinates and the one or more second geographic coordinates.

When the vehicle 100 receives one or more second geographic coordinates from at least four ground units 200, the vehicle 100 can determine a position of the vehicle 100 based on the one or more second geographic coordinates. When the vehicle 100 receives one or more second geographic coordinates from at least three ground units 200, the vehicle 100 can determine a position of the vehicle 100 based on the one or more second geographic coordinates and a known altitude of the vehicle 100.

When the vehicle 100 receives one or more second geographic coordinates from at least two ground units 200, the vehicle 100 can receive one or more signals associated with one or more sensors of at least two ground units 200. The vehicle 100 can define a line based on the one or more second geographic coordinates. The vehicle 100 can determine a position of the aircraft based on the one or more second geographic coordinates, a known altitude of the aircraft, and a Doppler effect demonstrated by the acoustic signal. The one or more signals can indicate a desirable event has occurred on one side of the line, and the vehicle 100 can be caused to navigate to the one side of the line. The one or more signals can indicate an undesirable event has occurred on one side of the line, and the vehicle 100 can be caused to navigate away from the one side of the line.

Figure 7:
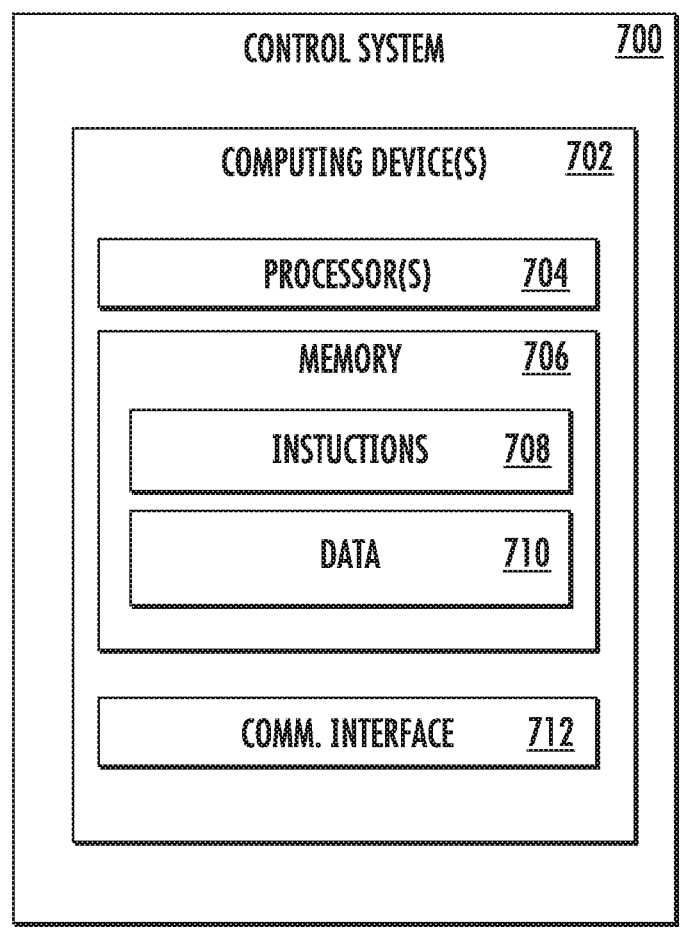
FIG. 7 depicts a computing system for implementing one or more aspects according to example embodiments of the present disclosure.

FIG. 7 depicts a block diagram of an example computing system that can be used to implement the control system 700 or other systems of the aircraft according to example embodiments of the present disclosure. As shown, the control system 700 can include one or more computing device(s) 702. The one or more computing device(s) 702 can include one or more processor(s) 704 and one or more memory device(s) 706. The one or more processor(s) 704 can include any suitable processing device, such as a microprocessor, microcontroller, integrated circuit, logic device, or other suitable processing device. The one or more memory device(s) 706 can include one or more computer-readable media, including, but not limited to, non-transitory computer-readable media, RAM, ROM, hard drives, flash drives, or other memory devices.

The one or more memory device(s) 706 can store information accessible by the one or more processor(s) 704, including computer-readable instructions 708 that can be executed by the one or more processor(s) 704. The instructions 708 can be any set of instructions that when executed by the one or more processor(s) 704, cause the one or more processor(s) 704 to perform operations. The instructions 708 can be software written in any suitable programming language or can be implemented in hardware. In some embodiments, the instructions 708 can be executed by the one or more processor(s) 704 to cause the one or more processor(s)

704 to perform operations, such as the operations for navigating an aerial vehicle, as described with reference to FIG. 6, and/or any other operations or functions of the one or more computing device(s) 702.

The memory device(s) 706 can further store data 710 that can be accessed by the processors 704. For example, the data 710 can include a navigational database, data associated with the navigation system(s), data associated with the control mechanisms, data indicative of a flight plan associated with the vehicle 100, data associated with geographic coordinates, and/or any other data associated with vehicle 100, as described herein. The data 710 can include one or more table(s), function(s), algorithm(s), model(s), equation(s), etc. for navigating the vehicle 100 according to example embodiments of the present disclosure.

The one or more computing device(s) 702 can also include a communication interface 712 used to communicate, for example, with the other components of system. The communication interface 712 can include any suitable components for interfacing with one or more network(s), including for example, transmitters, receivers, ports, controllers, antennas, or other suitable components.

Figure 8:
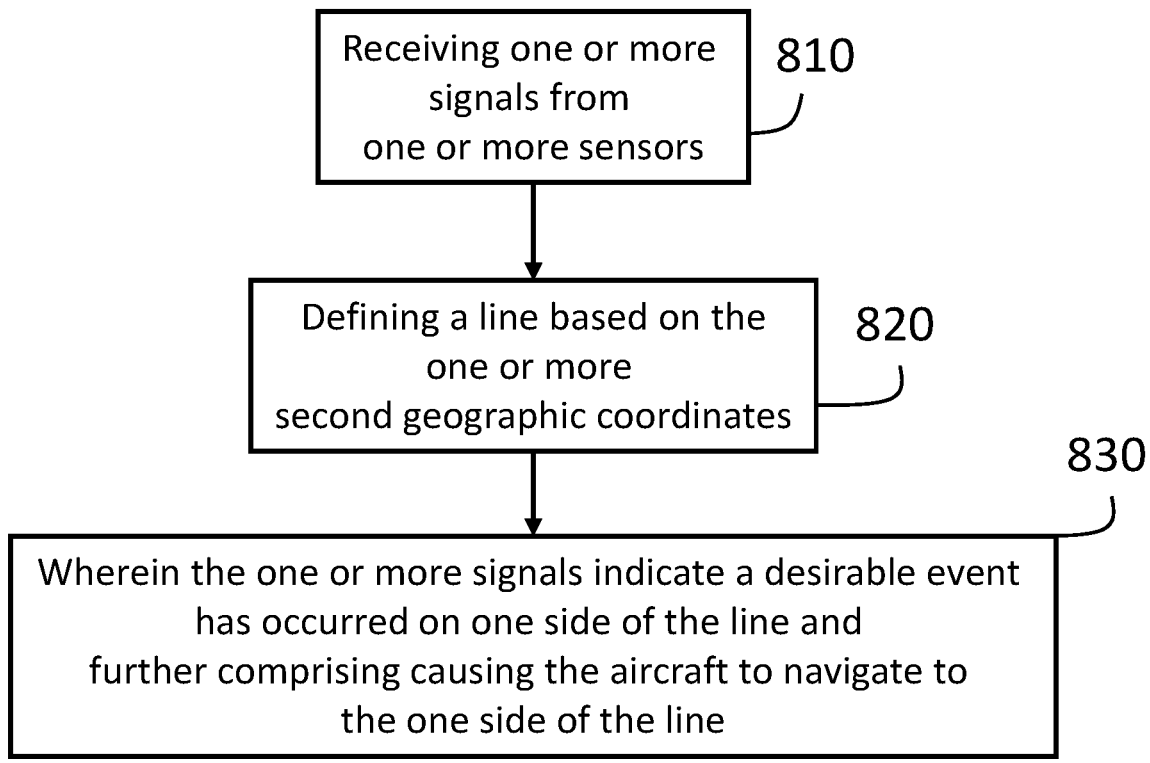
FIG. 8 depicts a flow diagram of an example method according to example embodiments of the present disclosure.

Turning now to FIG. 8, and with continued reference to FIG. 6, a flow diagram is illustrated of an example method for providing navigation assistance from a ground unit to an aerial vehicle. The method of FIG. 6 can be implemented using, for instance, the vehicle 100 of FIG. 1. FIG. 6 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At (810), the vehicle 100 can receive one or more signals from one or more sensors. At (820), a line can be defined based on the one or more second geographic coordinates (e.g., such as one or more second geographic coordinates at step (604) in FIG. 6). Step (830) sets forth that the one or more signals indicate a desirable event has occurred on one side of the line and further comprising causing the aircraft to navigate to the one side of the line.

Figure 9:
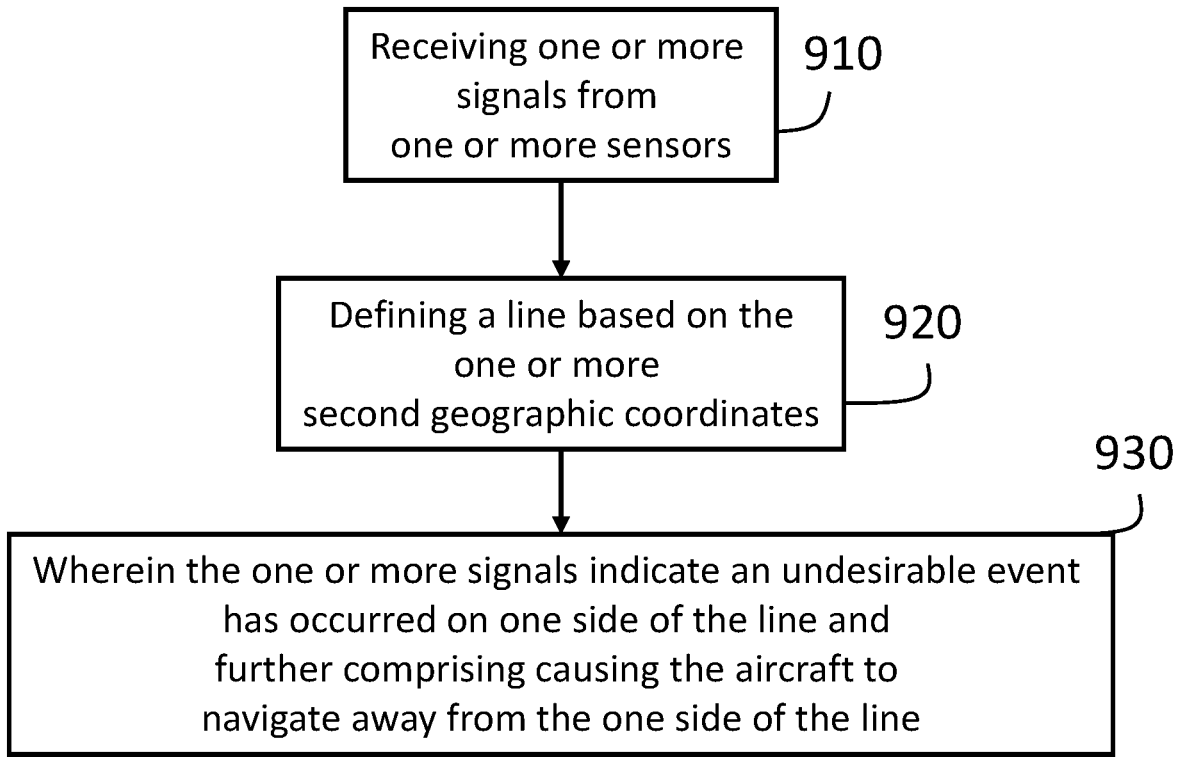
FIG. 9 depicts a flow diagram of an example method according to example embodiments of the present disclosure.

Turning now to FIG. 9, and with continued reference to FIG. 6, a flow diagram is illustrated of an example method for providing navigation assistance from a ground unit to an aerial vehicle. The method of FIG. 6 can be implemented using, for instance, the vehicle 100 of FIG. 1. FIG. 6 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At (910), the vehicle 100 can receive one or more signals from one or more sensors. At (920), a line can be defined based on the one or more second geographic coordinates (e.g., such as one or more second geographic coordinates at step (604) in FIG. 6). Step (830) sets forth that the one or more signals indicate an undesirable event has occurred on one side of the line and further comprising causing the aircraft to navigate away from the one side of the line.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for navigating an aircraft comprising:
   receiving, by one or more processors, one or more first geographic coordinates via an interface configured to receive geographic coordinates from a satellite transmission;
   receiving, by the one or more processors, one or more second geographic coordinates via an interface configured to receive geographic coordinates from a ground transmission;
   determining, by the one or more processors, that the one or more first geographic coordinates and the one or more second geographic coordinates are inconsistent;
   updating, by the one or more processors, a flight plan using the one or more second geographic coordinates when the one or more first geographic coordinates are inconsistent with the one or more second geographic coordinates; and
   creating, by the one or more processors, an alert regarding the inconsistency between the one or more first geographic coordinates and the one or more second geographic coordinates,
   wherein the one or more second geographic coordinates are received from one or more ground units, the one or more second geographic coordinates being manually entered into the one or more ground units when the one or more ground units are positioned.

2. The method of claim 1, wherein receiving one or more second geographic coordinates via an interface configured to receive geographic coordinates from a ground transmission further comprises receiving one or more second geographic coordinates from at least four ground units.

3. The method of claim 2, further comprising determining a position of the aircraft based on the one or more second geographic coordinates.

4. The method of claim 1, wherein receiving one or more second geographic coordinates via an interface configured to receive geographic coordinates from a ground transmission further comprises receiving one or more second geographic coordinates from at least three ground units.

5. The method of claim 4, further comprising determining a position of the aircraft based on the one or more second geographic coordinates and a known altitude of the aircraft.

6. The method of claim 1, wherein receiving one or more second geographic coordinates via an interface configured to receive geographic coordinates from a ground transmission further comprises receiving one or more second geographic coordinates from at least two ground units.

7. The method of claim 6, further comprising:
   receiving one or more signals from one or more sensors; and
   defining a line based on the one or more second geographic coordinates.

8. The method of claim 7, wherein the one or more signals comprise an acoustic signal and further comprising determining a position of the aircraft based on the one or more second geographic coordinates, a known altitude of the aircraft, and a Doppler effect demonstrated by the acoustic signal.

9. The method of claim 7, wherein the one or more signals indicate a desirable event has occurred on one side of the line and further comprising causing the aircraft to navigate to the one side of the line.

10. The method of claim 7, wherein the one or more signals indicate an undesirable event has occurred on one side of the line and further comprising causing the aircraft to navigate away from the one side of the line.

* * * * *